(12) United States Patent
Chouet

(10) Patent No.: US 12,543,704 B2
(45) Date of Patent: Feb. 10, 2026

(54) COLLAR-LEASH ASSEMBLY WITH INTEGRATED REEL

(71) Applicant: Chouet Watch, Houtaud (FR)

(72) Inventor: Claude Chouet, Houtaud (FR)

(73) Assignee: COLLI & CO, Myon (FR)

( * ) Notice: Subject to any disclaimer, the term of this patent is extended or adjusted under 35 U.S.C. 154(b) by 108 days.

(21) Appl. No.: 17/915,721

(22) PCT Filed: Apr. 1, 2021

(86) PCT No.: PCT/IB2021/052755
§ 371 (c)(1),
(2) Date: Sep. 29, 2022

(87) PCT Pub. No.: WO2021/198986
PCT Pub. Date: Oct. 7, 2021

(65) Prior Publication Data
US 2023/0140687 A1    May 4, 2023

(30) Foreign Application Priority Data

Apr. 2, 2020 (FR) ...................................... 2003295

(51) Int. Cl.
*A01K 27/00* (2006.01)
(52) U.S. Cl.
CPC .......... *A01K 27/004* (2013.01); *A01K 27/001* (2013.01)
(58) Field of Classification Search
CPC ............................ A01K 27/004; A01K 27/001
See application file for complete search history.

(56) References Cited

U.S. PATENT DOCUMENTS

| 870,784 A | * | 11/1907 | Huff ..................... A01K 27/004 |
| | | | 119/794 |
| 2,222,409 A | * | 11/1940 | Gottlieb ............... A01K 27/004 |
| | | | 242/380 |
| 3,477,410 A | | 11/1969 | Lettieri |

(Continued)

FOREIGN PATENT DOCUMENTS

| FR | 2409002 A1 | 6/1979 |
| WO | WO2014151948 A1 | 9/2014 |

*Primary Examiner* — Joshua J Michener
*Assistant Examiner* — Nicole Paige Maccrate
(74) *Attorney, Agent, or Firm* — Christian S. Hans; Bret E. Field; Bozicevic, Field & Francis LLP

(57) ABSTRACT

The invention relates to a collar-leash assembly with integrated reel for a pet such as a dog. The leash of this collar-leash assembly can be withdrawn by unwinding, then, after use, retracted by allowing it to wind itself up. This collar-leash assembly with integrated reel for a pet comprises: —a collar (1) intended to be wound around a part of the body of the animal, —a housing (2) secured to the collar (1) and provided with a leash reel (22, 25), this housing comprising a base (4), a housing body (10), a part having a hollow, tapped center (16, 27, 31), and an assembly screw that is able to cooperate with this part (16, 27, 31), the base (4) comprising a planar part (5) having a hole (6) at its center and two branches (7) and the housing body (10) being free to rotate relative to the base (4) of the housing (2), a leash (43) of which one end is secured in the leash reel (22, 25) and—a gripping loop (3) which is secured to the other end of the leash (43) and of which the interior corresponds to the lateral perimeter (13) of the housing (2).

10 Claims, 6 Drawing Sheets

(56) References Cited

U.S. PATENT DOCUMENTS

Figure 1:
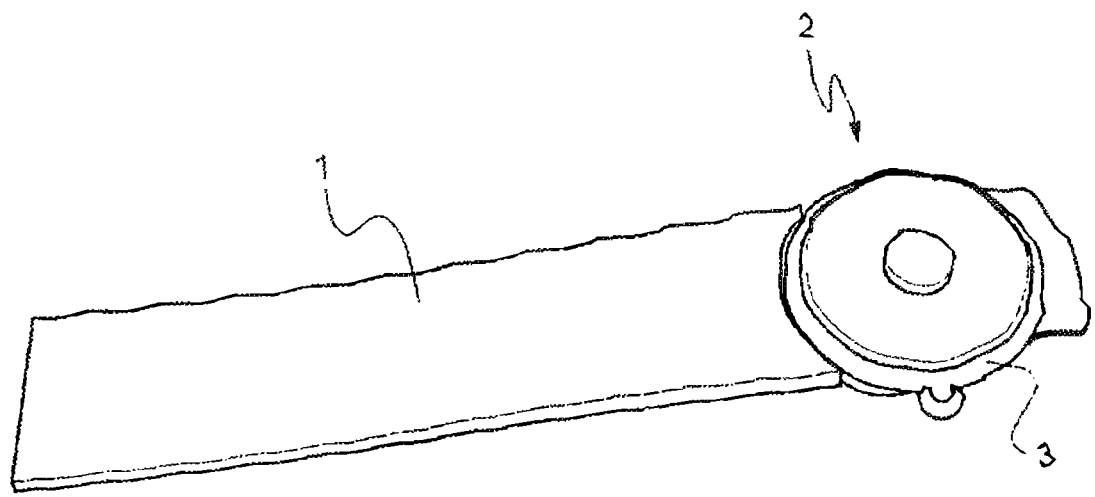

| | | | | |
|---|---|---|---|---|
| 4,964,370 | A | * 10/1990 | Peterson | A01K 27/004 |
| | | | | 242/379 |
| 2006/0054108 | A1 | 3/2006 | Eulute et al. | |
| 2006/0236956 | A1* | 10/2006 | Lord | A01K 27/004 |
| | | | | 119/794 |
| 2009/0255486 | A1* | 10/2009 | Thompson | A01K 27/004 |
| | | | | 119/794 |
| 2013/0247838 | A1* | 9/2013 | Cromwell | A01K 27/004 |
| | | | | 119/794 |
| 2016/0270373 | A1 | 9/2016 | Bova et al. | |
| 2018/0242557 | A1 | 8/2018 | Woods | |

* cited by examiner

COLLAR-LEASH ASSEMBLY WITH INTEGRATED REEL

The invention relates to a collar-leash assembly with integrated reel for a pet such as a dog. The leash of this collar-leash assembly can be withdrawn by unwinding, then, after use, retracted by allowing it to wind itself up.

BACKGROUND OF THE INVENTION

Collars with an integrated leash and reel have been known for a long time already, at least since the publication of French patent FR 975 823 in October 1950. Since then, numerous patent applications have been filed to protect (or attempt to protect) variants of all kinds: a leash composed of two strings and two reels, reels intended for the pet's mistress or master to hold by hand, systems for blocking the unwinding and/or winding of the leash, etc.

The most recent trend is to optimize the shapes of the collar-leash, so that the leash in the wound-up state occupies as little space as possible.

Thus, the U.S. patent application published under no. US2011/0023794 proposes an adjustable collar with a retractable leash whose handle can be pushed into the lateral side of the reel's housing.

The U.S. patent application published under no. 2009/0255486 relates to a collar and a combined leash whose handle covers the reel's housing and is held in place by means of two magnets.

More recently, the U.S. patent application published under no. US2011/0036304 has disclosed a collar combined with a retractable leash whose end is provided with a loop intended to be secured, in the leash's wound-up state, in a space formed by two protuberances projecting from an outer face of the reel's housing.

BRIEF SUMMARY OF THE INVENTION

The goal of the invention is to propose a collar-leash assembly with integrated reel for a pet, which:
  is simple to produce,
  is easy to use,
  is composed of minimal parts,
  optimizes the occupied space and shapes in order to achieve miniaturization, all while remaining functional,
  does not include a gripping surface that could cause discomfort or danger to the animal,
  can be left permanently on the animal's body,
  is sufficiently resistant to the pet's pulling,
  is easy to disassemble to change a part, in particular the leash or a part of the reel,
  is lightweight, and
  is attractive.

According to the invention, this goal is achieved by a collar-leash assembly with integrated reel in accordance with the following point 1:
  1. A collar-leash assembly with integrated reel for a pet, comprising:
    a collar intended to be wound around a part of the body (neck, chest, etc.) of the animal,
    a housing secured to the collar and provided with a leash reel,
    a leash of which one end is secured into the leash reel,
    a gripping loop (ring, rectangle, etc.) which is secured to the other end of the leash,
    this collar-leash assembly being distinguished in that the interior (dimensions and shape) of the gripping loop corresponds to the lateral perimeter of the housing, so as to be form-fitting with the latter and to be able to be placed around it.

The loop offers the advantage of being easier to use than a handle such as, for example, that of the collar of the aforementioned U.S. patent application no. 2011/0023794.

Advantageous characteristics of the collar-leash assembly with integrated reel in the aforementioned point 1 are indicated in the following points 1 to 11:
  2. A collar-leash assembly according to point 1, wherein the housing comprises a base, a housing body, an elongated nut, and an assembly screw that is able to cooperate with this elongated nut.
  3. A collar-leash assembly according to point 2, wherein the base comprises a planar part having a hole at its center and two branches, each formed by a wall which rises from the planar part and is extended at its upper end by a flange forming an angle.
  4. A collar-leash assembly according to one of points 2 and 3, wherein the elongated nut has a notch.
  5. A collar-leash assembly according to one of points 2 to 4, wherein the housing body is hollow and has a closed upper end having a hole at its center for the passage of the elongated nut, an open lower end, and a lateral hole for the passage of the leash.
  6. A collar-leash assembly according to one of the preceding points, wherein the gripping loop comprises on its periphery a ring.
  7. A collar-leash assembly according to one of the preceding points, wherein the collar is composed of two half-collars each having one end intended to be secured to a flange on the base.
  8. A collar-leash assembly according to one of the preceding points, wherein the lateral perimeter of the housing and the gripping loop are circular.
  9. A collar-leash assembly according to one of the preceding points, wherein the lateral perimeter of the housing comprises means for improving the holding of the gripping loop on the housing.
  10. A collar-leash assembly according to one of points 2 to 9, characterized in that the housing body is free to rotate about the housing base.

Figure 2:
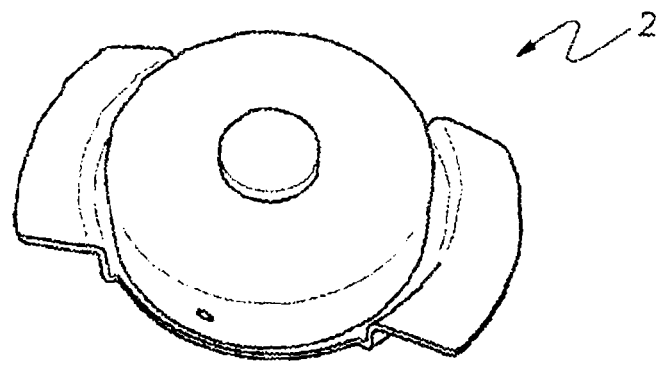
Figure 3:
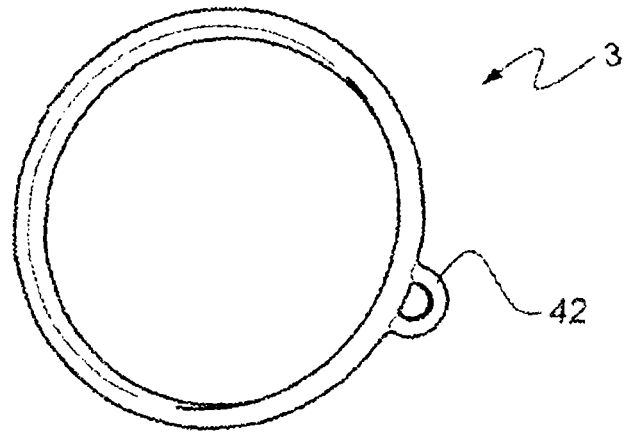
Figure 4:
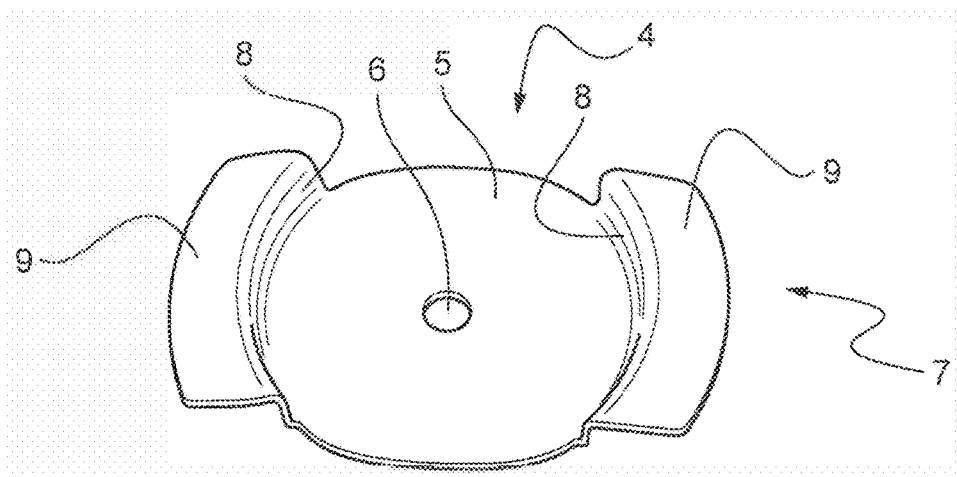
Figure 5:
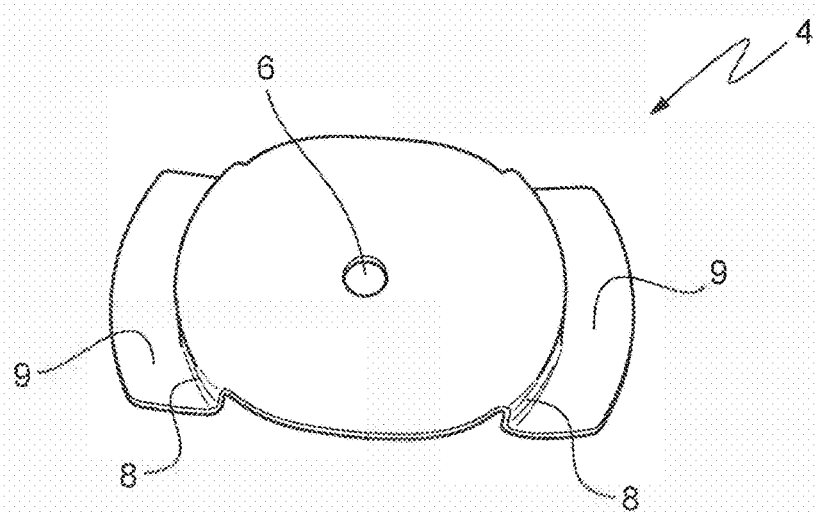
Figure 6:
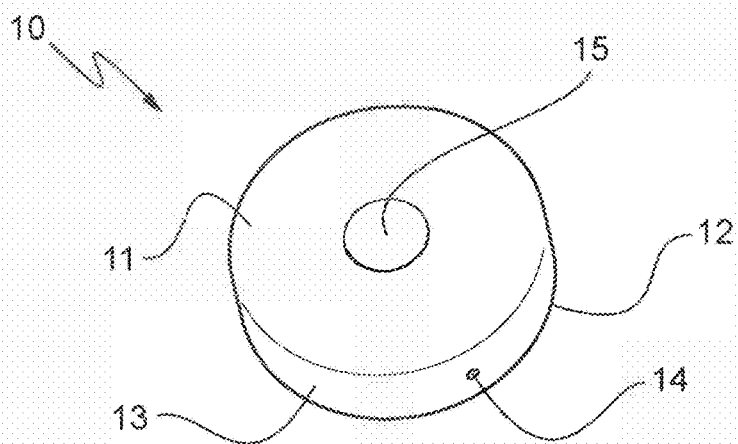
Figure 7:
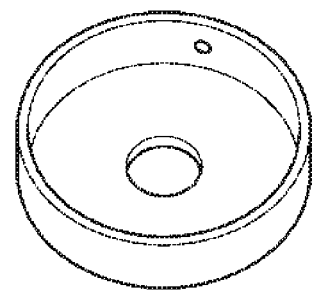
Figure 8:
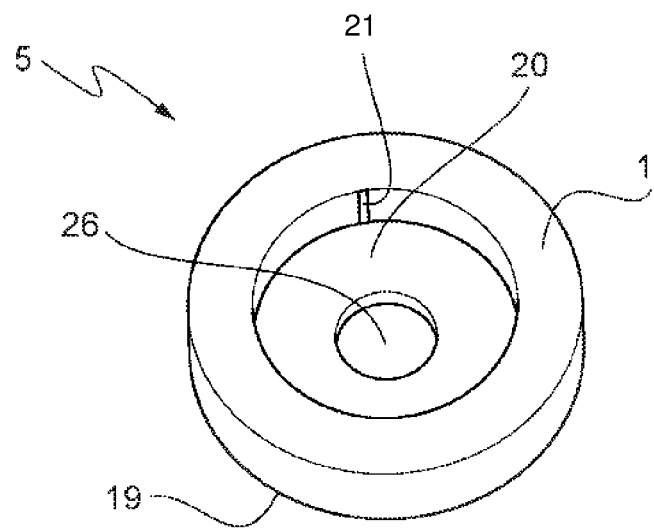
Figure 9:
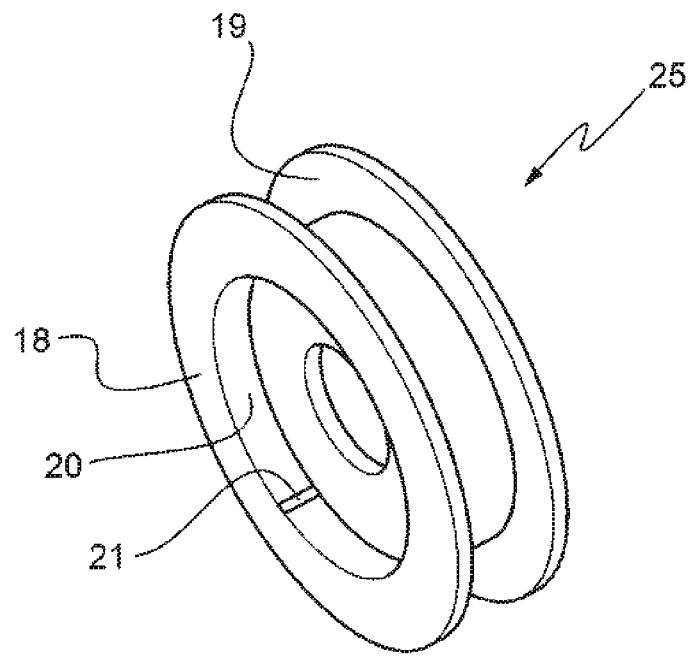
Figures 10, 11:
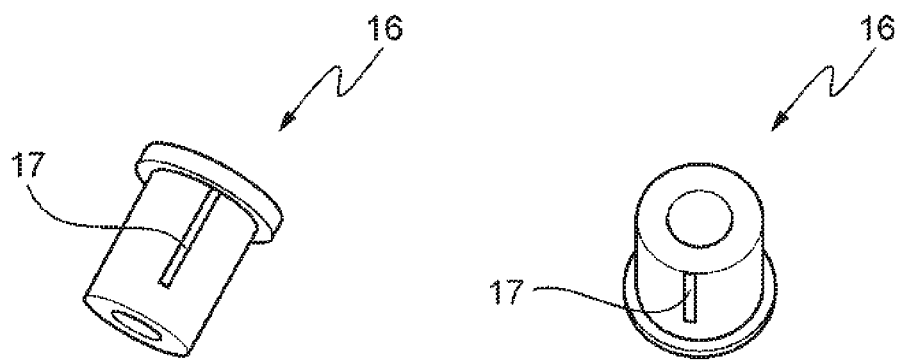
Figure 12:
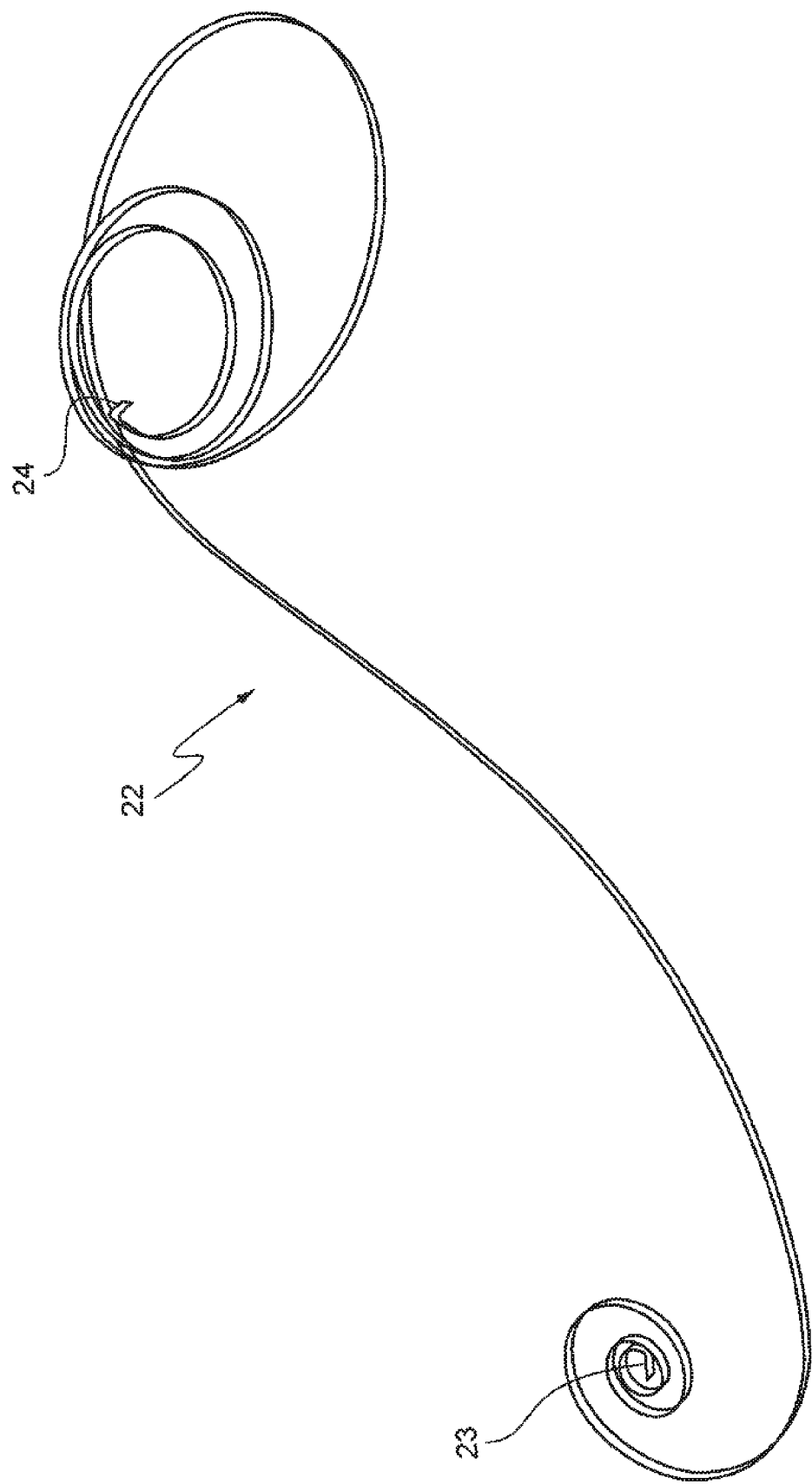
Figure 13:
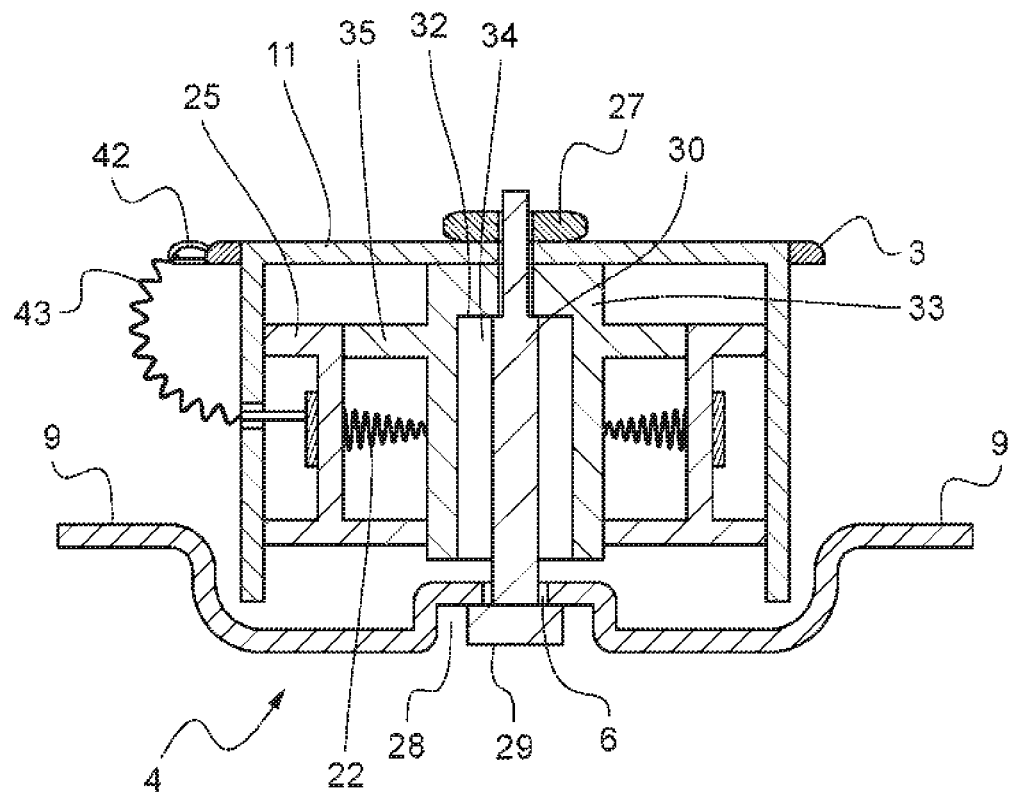
Figure 14:
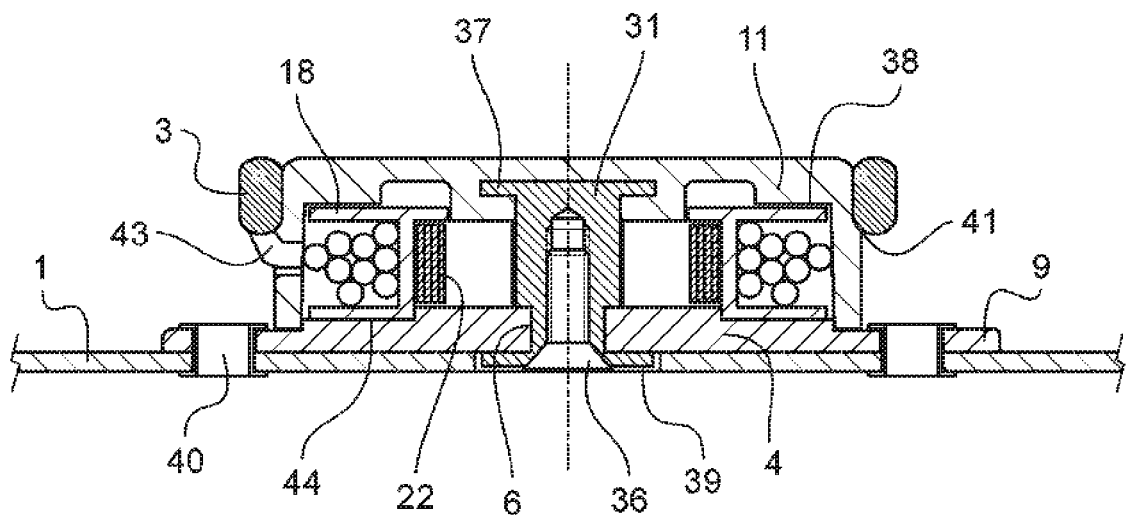

Other characteristics and advantages of the invention will now be described in detail in the following description which is given with reference to the appended figures, which schematically show:

FIG. 1: a part of the collar-leash assembly according to the invention, in perspective;

FIG. 2: the housing of the collar-leash assembly according to the invention, in perspective;

FIG. 3: the gripping loop of the collar-leash assembly according to the invention, as a top view in perspective;

FIG. 4: the base of the housing of FIG. 2, as a top view in perspective;

FIG. 5: the base of FIG. 4, as a bottom view in perspective;

FIG. 6: the housing body of FIG. 2, as a top view in perspective;

FIG. 7: the housing body of FIG. 6, as a bottom view in perspective;

FIG. 8: the reel of the collar-leash assembly according to the invention, as a top view in perspective;

FIG. 9: the reel of FIG. 8, as a side view in perspective;

FIG. 10: a housing nut, as a side view in perspective;

FIG. 11: the nut of FIG. 9, as a bottom view in perspective;

FIG. 12: a spiral spring of the housing reel of the collar-leash assembly according to the invention;

FIG. 13: a second embodiment of the collar-leash assembly according to the invention (without the collar); and FIG. 14: a third embodiment of the collar-leash assembly according to the invention;

DETAILED DESCRIPTION OF THE INVENTION

A first embodiment of the collar-leash assembly with integrated reel according to the invention is shown in FIGS. 1 to 12.

This collar-leash assembly comprises firstly a collar composed of two half-collars 1, only one of which is visible in FIG. 1. One of the ends of this half-collar 1 is secured to a housing 2 surrounded by a gripping loop 3.

An overview of the housing 2 is shown in FIG. 2. It is composed of a base 4 visible in FIG. 4, which comprises a planar part 5 which may be discoidal and which comprises a hole 6 at its center and two branches 7, preferably symmetrically opposed and each formed by a wall 8 which rises from the periphery of the planar part 5 and is extended at its upper end by a flange 9 forming an angle toward the exterior and to which a half-collar 1 is intended to be secured in a known manner, for example by means of rivets. As a variant, a circular edge may also be envisaged in place of the branches 7 or somehow extending the latter.

When the planar part 5 is discoidal, the walls 8 are arcs of a cylinder and the flanges 9 are arcs of a ring.

The central hole 6 of the base 4 is intended to receive a conventional assembly screw (not shown).

The walls 8 form a partial compartment for another component of the housing 10 which is the housing body 10 shown in FIG. 6.

This housing body 10 is hollow and may be cylindrical in shape. It has a closed upper end 11 and an open lower end 12.

The lower end 12 is intended to rest on the planar part 5 of the base 4. The lateral perimeter 13 of the housing body 10, located between the lower end 12 and the upper end 11, is intended to be partially inserted between the walls 8 and has a lateral hole 14 for the passage of the leash.

The closed upper end 11 of the housing body 10 has at its center a hole 15 intended to receive another component element of the housing, namely an elongated nut with a preferably flat head 16 visible in FIGS. 10 and 11. The interior of the nut 16 is tapped in order to be able to cooperate with the assembly screw of the housing. The longitudinal cylindrical part of the nut 16 is provided with a longitudinal notch 17.

The interior of the housing body 10 is intended to house a leash reel. The latter is composed of a reel 25 visible in FIGS. 8 and 9 and a spiral spring 22 shown in FIG. 12.

The reel 25 has a perforated spindle 26, an upper part with an upper edge 18 and a lower part with a lower edge 19. The upper part is provided with a cylindrical central recess 20 intended to house the spiral spring 22, and its peripheral wall has a groove 21 for receiving an end 24 of this spring. The other end 23 of the spiral spring 22 is intended to be housed in the notch 17 of the nut 16. In order to be well retained and to grip the groove 21 and the notch 17, respectively, the ends 24 and 23 form an angle with respect to the rest of the spiral spring 22.

As a variant, it is possible to envisage welding the ends 23 and 24, respectively, to the nut 16, in particular on its longitudinal cylindrical part, and to the reel 25, in particular, on the interior of the cylindrical central recess 20, in particular on its peripheral wall. However, this would make it more difficult to replace the spiral spring 22 in the event of breakage.

The interior part 19 of the reel 25 is intended to rest on the base 4 of the housing 2. The space formed between the upper edge 18 and the lower edge 19 is intended to house the leash. One end of this leash is secured to the reel 25, for example by means of a knot. The leash passes through the lateral hole 14 of the housing body 10 containing the reel 25, and its other end is secured to the gripping loop 3. The latter preferably comprises on its periphery a ring 42 for securing the other end of the leash, for example using of a knot.

According to the invention, the shape and dimensions of the loop 3, in particular the interior of this loop, allow it to be placed around the housing 2, around the housing body 10. The gripping loop 3 is preferably of small thickness relative to the height of the housing body. It should allow the passage of at least one finger of a user (the pet's mistress or master), and its shape may be a ring, rectangle, oval, etc., with its shape obviously corresponding to the shape of the housing body, more precisely to the shape of the lateral perimeter of the latter.

The fitting of the housing body 10 on the interior of the gripping loop 3, made possible by the complementarity between the shapes of the loop 3 and the lateral perimeter 13 of the body 10 of the housing 12, is preferably provided with a small clearance adjustment, so that the loop 3 is held in place around the housing body 10.

In addition, the spiral spring 22 is preferably prestressed in the reel so that the rotational stress that it exerts on the reel 25 results in a pulling on the leash, which in turn pulls on the loop 3 and forces it to remain around the housing body 10.

Thus, once around the housing body 10, the gripping loop 3 causes only a very small increase in the volume of the housing 2. It follows that the collar-leash assembly according to the invention optimizes the shapes and dimensions of its components, which allows it to remain discreet around the pet's body, so as not to disturb it and not to cause any danger, all while remaining, of course, functional. In addition, the length of the leash is preferably chosen to be less than that of the spiral spring, so that when the leash is fully unwound, the spiral spring is not fully stretched and thus cannot be damaged.

It is possible to provide on the lateral perimeter of the housing body 10, close to the upper end of the latter, at least one small nub to prevent the gripping loop 3 from unintentionally becoming detached. The user, after retracting the leash into the housing 2 by winding, then presses on the loop 3 to force it to pass over the nub. The loop 3 will then normally no longer be able to be released from the housing 2 without user intervention. The figures show a housing 2 of a cylindrical shape. However, the invention is not limited to this shape. It is possible to envisage other shapes, provided that the gripping loop is sized and shaped so as to be able to be placed around the lateral perimeter of the housing. Thus, the housing may, for example, be of parallelepipedal shape. However, such a shape would not be optimal in terms of the use of space.

According to a second advantageous embodiment of the invention, the housing body 10 is intended to rotate freely relative to the base 4.

This second embodiment is shown in FIG. 13. It differs from the first embodiment in that the hole 6 of the base 4 is located in a recess 28 turned toward the housing 2 and provided in the center of the planar part 5 of the base 4.

As can be seen in the figure, a nut 27 is provided at the top of the housing 2 to cooperate with an assembly screw 30.

The latter comprises a shoulder 32 and a head 29, which is intended to be placed in the hole 6 of the recess 28. A clearance is provided to allow the assembly screw 30 to rotate relative to the base 4. The recess 28 allows for rotation without rubbing on the animal's body.

Also, there is provided a cylindrical part 33 having
a longitudinal recess 34 for receiving the lower part of the assembly screw 30 and
a closed upper end whose interior abuts against the shoulder 32.

This upper end has a hole for the passage of the upper part of the assembly screw 30.

The upper end 11 of the housing body 10 is clamped between the nut 27 and the exterior of the closed upper end of the hollow cylindrical part 33.

The hole 15 of the housing body 10 is traversed by the upper part of the assembly screw 30.

In order to facilitate the holding and the rotation of the reel 25, it is possible to provide for the hollow cylindrical part 33 to comprise an annular part 35 at its closed upper end or close to this end.

It can be seen that, in this second embodiment, the assembly screw 30 and the nut 27 secure the housing body 10 to the hollow cylindrical part 33. The entire housing 1 can rotate relative to the base 4. Of course, the reel 25 is, as in all the embodiments, free to rotate about the hollow part 33 and drives with it, on the one hand, the spiral spring 22, held by the groove 21 and the notch 17 of the hollow cylindrical part 33 similar to that of the elongated nut 16, and, on the other hand, the leash 43 connected to the ring 3 and to an exterior surface of the reel 25, between the lower 18 and upper 19 rims, as in the first embodiment.

A third embodiment is shown in FIG. 14. As in the second embodiment, the housing body 10 is intended to rotate freely relative to the base 4.

It differs from the first embodiment in that:
the part having a hollow and tapped center is an insert 31 in the form of a cylinder whose interior is hollow and tapped to cooperate with an assembly screw 36 and which has at its top an annular part 37, and in that
the upper part 11 of the housing body 10 has a groove receiving the annular part 37 and preventing it from rotating.

This can be obtained by overmolding the housing body 21 on the insert 31, the latter preferably being made of metal and the housing body 21 possibly being made of plastic.

Preferably, the interior of the housing body 10 has a bore 38 in its upper part 11, in order to receive the upper part of the reel 25, in order to facilitate the holding of the latter and its rotation.

Similarly, it is preferable to provide on the upper face of the base 4 a bore 44 for receiving the lower part of the reel 25, in order to facilitate its holding and its rotation.

Advantageously, a washer 39 is provided between the head of the assembly screw 36 and the hole 6 of the planar part 5 of the base 4, to facilitate rotation or to allow the use of a screw whose head has a smaller diameter.

The diameter of the insert 31 may also be reduced at its end intended to penetrate into the hole 6.

As can be seen in FIG. 14, a bore 41 made on the top of the housing body 10 can facilitate the sliding of the ring 3 around the housing body 10 and its coming into abutment against the shoulder of the housing body 10 at the end of the bore, so that this ring 3 does not move too far away from the exterior face of the upper part of the housing body 10 as it descends and so that it can be easily removed by a user.

The collar 1 can be secured to branches which are not raised relative to the lower face of the base 4.

The securing can be carried out in all the embodiments by means of rivets 40.

The invention claimed is:

1. A collar-leash assembly for a pet, comprising:
a collar intended to be wound around a part of a body part of the pet,
a housing secured to the collar and provided with a leash reel, this housing comprising:
a base, a housing body, a part having a hollow and tapped center, and an assembly screw that is able to cooperate with the part having the hollow and tapped center,
the base comprising a planar part having a hole at its center and two branches and
the housing body being free to rotate relative to the base of the housing,
a leash of which one end is secured in the leash reel and
a gripping loop secured to an opposite end of the leash and whose interior corresponds to a lateral perimeter of the housing
wherein:
the part having the hollow and tapped center is an insert in the form of a cylinder which has at its top an annular part, and
an upper part of the housing body has a groove receiving the annular part and preventing it from rotating.

2. A collar-leash assembly according to claim 1, wherein the housing body is hollow and comprises an open lower end and a lateral hole for the passage of the leash.

3. A collar-leash assembly according to claim 1, wherein the part having the hollow and tapped center includes a notch.

4. A collar-leash assembly according to claim 1, wherein the gripping loop comprises on its periphery a ring.

5. A collar-leash assembly according to claim 1, wherein the collar is composed of two half-collars, each having one end intended to be secured to a flange on the base.

6. A collar-leash assembly according to claim 1, wherein the lateral perimeter of the housing and the gripping loop are circular.

7. A collar-leash assembly according to claim 1, wherein the lateral perimeter of the housing comprises means for improving the holding of the gripping loop on the housing.

8. A collar-leash assembly according to claim 1, wherein an interior of the housing body has a bore in its upper part capable of receiving the upper part of the leash reel.

9. A collar-leash assembly according to claim 1, further comprising, on an upper face of the base, a bore for receiving a lower part of the leash reel, in order to facilitate its holding and its rotation.

10. A collar-leash assembly according to claim 1, wherein a washer is provided between a head of the assembly screw and the hole of the base.

* * * * *